United States Patent
Gumprecht et al.

(10) Patent No.: US 8,485,548 B2
(45) Date of Patent: Jul. 16, 2013

(54) AIRBAG ARRANGEMENT, ESPECIALLY A SIDE AIRBAG ARRANGEMENT, IN A VEHICLE SEAT

(75) Inventors: Michael Gumprecht, Nassenfels (DE); Thomas Frank, Neuburg (DE)

(73) Assignee: Faurecia Autositze GmbH (DE)

( * ) Notice: Subject to any disclaimer, the term of this patent is extended or adjusted under 35 U.S.C. 154(b) by 125 days.

(21) Appl. No.: 13/111,899

(22) Filed: May 19, 2011

(65) Prior Publication Data

US 2011/0285116 A1    Nov. 24, 2011

(30) Foreign Application Priority Data

May 22, 2010    (DE) .......................... 10 2010 021 297

(51) Int. Cl.
*B60R 21/201* (2006.01)
*B60R 21/207* (2006.01)

(52) U.S. Cl.
USPC ................. 280/730.2; 280/728.2; 280/743.1; 297/216.13

(58) Field of Classification Search
USPC ............. 280/730.2, 728.2, 728.3, 728.1, 742, 280/743.1; 297/216.13
See application file for complete search history.

(56) References Cited

U.S. PATENT DOCUMENTS

| | | | |
|---|---|---|---|
| 5,967,603 A | 10/1999 | Genders et al. | |
| 6,045,151 A * | 4/2000 | Wu | 280/728.3 |
| 7,458,603 B2 * | 12/2008 | Buono et al. | 280/728.2 |
| 7,637,531 B2 * | 12/2009 | Paruszkiewicz et al. | 280/730.2 |
| 7,823,912 B2 * | 11/2010 | Tracht et al. | 280/730.2 |
| 7,954,842 B2 * | 6/2011 | Deppe et al. | 280/728.3 |
| 8,113,539 B2 * | 2/2012 | Paruszkiewicz et al. | 280/728.3 |
| 8,167,333 B2 * | 5/2012 | Tracht et al. | 280/730.2 |
| 8,235,415 B2 * | 8/2012 | Gamill et al. | 280/730.2 |
| 2006/0113765 A1 | 6/2006 | Tracht | |
| 2007/0187933 A1* | 8/2007 | Tracht et al. | 280/730.2 |

* cited by examiner

*Primary Examiner* — Ruth Ilan
*Assistant Examiner* — Darlene P Condra
(74) *Attorney, Agent, or Firm* — Robert Becker; Becker & Stachniak, P.C.

(57) ABSTRACT

An airbag arrangement in a vehicle seat, especially in a backrest, comprising an airbag module composed of an airbag housing, an airbag, and a charge for unfolding of the airbag, and a guide pocket attached to a covering of the vehicle seat in the region of an opening line of the covering. The guide pocket guides the airbag, as it unfolds, to the opening line, and wraps around the airbag module and a component secured to the vehicle seat. The two front ends of the guide pocket are attached in the region of the opening line of the covering. The airbag module is secured to the component, and the guide pocket is placed from above or from below about the component and the airbag module and extends about the airbag module in a loop-shaped manner.

10 Claims, 3 Drawing Sheets

AIRBAG ARRANGEMENT, ESPECIALLY A SIDE AIRBAG ARRANGEMENT, IN A VEHICLE SEAT

The instant application should be granted the priority date of May 22, 2010 the filing date of the corresponding German patent application 10 2010 021 297.0.

BACKGROUND OF THE INVENTION

The present invention relates to an airbag arrangement, especially a side airbag arrangement, in a vehicle seat, especially in a backrest of a vehicle seat.

An airbag arrangement in a vehicle seat is generally formed by an airbag module that is provided with an airbag housing that is secured to a frame part or a structural part of a vehicle seat, and that has an airbag and a charge. Generally, the airbag module is disposed below the covering of the vehicle seat, whereby the covering generally has an opening line, for example a tear seam, that tears open upon ignition of the airbag and frees space for the unfolding airbag.

DE 10 2005 057 437 A1 discloses a side airbag system in a vehicle seat where a reinforcing panel is provided as a guide device for deflecting the unfolding airbag. A rim of the reinforcing panel is secured to either the screws of an inflation member or to the seat frame, while its opposite edge is fixedly stitched to a border on one side of a tear seam. In this connection, the reinforcing panel, as a flat layer, extends from the fastening screws, along the housing of the airbag module, and between a foam body and the covering to the tear seam.

The reinforcing panel is thus to be formed with suitable holes through which are placed the fastening screws for the securement of the airbag module to the rest frame. Consequently, it is already necessary for the reinforcing panel to have a more complex configuration that is respectively model-specific for the pertaining vehicle seat and the airbag. Furthermore, the mounting requires a securement of the panel that is stitched to the covering between the frame and the airbag module, for which purpose the panel is mounted prior to mounting of the airbag module.

Such a mounting is therefore relatively complex; generally, the airbag module is first accommodated in the covering, in or on which the reinforcing panel is also secured, so that the airbag module, together with the reinforcing panel, can be screwed to the frame part. However, with some types of seats, for example rear seats or seats in a rear row of seats, which are provided on their backside with, for example, a plate or some other functional surface for forming a functional luggage space, such a mounting is very difficult or even impossible to carry out, since here first the airbag module must be mounted to the frame, and subsequently the cover is to be applied without its subsequently being possible to have access from the back side.

It is therefore an object of the present invention to provide an airbag arrangement, and a method for mounting the airbag arrangement or forming a vehicle seat, which enables a mounting with relatively little expenditure of effort.

BRIEF DESCRIPTION OF THE DRAWINGS

This object, and other objects and advantages of the present application, will appear more clearly from the following specification in conjunction with the accompanying schematic drawings, in which.

SUMMARY OF THE INVENTION

Figure 1:
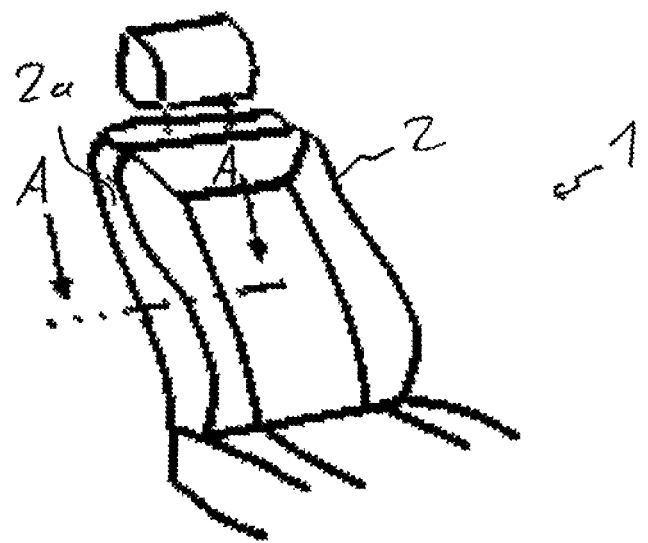
FIG. 1 is a perspective view of one exemplary embodiment of an inventive vehicle seat.

The airbag arrangement of the present application comprises an airbag module composed of an airbag housing, an airbag, and a charge for an unfolding of the airbag; a guide means attached to a covering of the vehicle seat in the region of an opening line of the covering, wherein the guide means serves for a guidance of the airbag, as it unfolds, to the opening line, further wherein the guide means is a guide pocket that wraps around the airbag module and a component secured to the vehicle seat, for example to a frame of a vehicle seat, further wherein the guide pocket has two front ends that are attached in the region of the opening line of the covering, further wherein the airbag module is secured to the component that is secured to the vehicle seat, and wherein the guide pocket is adapted to be placed from above or from below about the secured component and the airbag module and to extend about the airbag module in a loop-shaped manner.

Furthermore, the method of the present invention for mounting an airbag arrangement on a vehicle seat, especially on a backrest of a vehicle seat, includes the steps of securing an airbag module to a component that is secured to a frame component of the vehicle seat; providing a cushion body, a covering, and a loop-shaped guide pocket, wherein the guide pocket has two front ends that are attached in the region of an opening line of the covering; from below or from above, placing the guide pocket about the component and the airbag module such that the guide pocket is wrapped about the airbag module and the component; and completely covering the cushion body and the frame component of the vehicle seat with the covering.

The present invention also relates to a vehicle seat comprising a frame component, a cushion body, a covering that extends about the frame component and the cushion body, and an airbag arrangement as defined above, wherein the guide pocket is mounted from above or from below about the component that is operatively secured to the car seat, being in particular secured to the frame component, and also about the airbag module, which is received by the component that is secured to the frame component.

Thus, pursuant to the present invention, a guide pocket is formed that extends about the airbag module and a component that is fixed to the frame, and the front ends of the guide pocket are attached in the region of the opening line of the covering. The opening line can, for example, be embodied as a tear seam or also as a perforation of the covering. The guide pocket is essentially loop-shaped, and can in particular be opened at the top and at the bottom. Its front ends can be sewn or stitched directly with the covering in a tear seam that represents the opening line; alternatively, the front ends of the guide pocket can also be sewn or stitched in a further seam that, for example, is disposed next to the opening line of the covering.

By providing a loop-shaped guide pocket, the latter can extend or be looped about the airbag module, whereby the loop shape is closed by the attachment of its two front ends to the covering. Thus, for the opening airbag merely the path toward the front is freed to the two ends, whereby during the inflation process of the airbag these ends are torn apart, thereby opening the opening line of the covering.

In contrast to the mounting of a reinforcing panel or a single-ply guide device, there is thus with the present invention already no requirement for a complicated securement to a component that is secured to the frame; in particular, it is not necessary to thread mounting bolts or screws through suitable holes of the guide pockets.

A particular advantage of the present invention results in that the guide pocket is installed from above or from below over the component that is secured to the frame together with the airbag module secured thereto. This enables a very straightforward installation, since on the one hand the airbag module can already be secured to the component that is secured to the frame, and furthermore the guide pocket is already attached to the covering, and thus the subsequent installation, for example by prefixing the cushion body to the frame component, mounting of the guide pocket about the component that is fixed to the frame and the airbag module, and subsequent covering via the covering can be effected.

The airbag module can be fixedly premounted on the component that is fixed to the frame via the fixed airbag housing of the airbag module, for example via a screw or bolt connection. The covering, together with the guide pocket attached thereto and the cushion body, can be placed on the frame component as a further unit. Subsequently, the guide pocket can be placed from above or from below over the component that is fixed to the frame, together with the airbag module secured thereto, without for this purpose requiring complex securement processes, such as the insertion of screws or the like. In this connection, the pocket glides over the component that is fixed to the frame and the airbag module that is secured thereto and extends about the latter. By means of this looping about or positive envelopment or containment, a very reliable accommodation is thus ensured. This mounting process can be connected with the covering or drawing-over of the covering, thus enabling a very straightforward assembly for the formation of the vehicle seat or a backrest of the vehicle seat.

The component that is secured to the frame can, in particular, be an adapter component or a mounting adapter, that is secured to the frame and that extends into a free space adjacent to the cushion body, whereby it preferably has a narrower connection portion that merges into a wider accommodation portion to which the airbag module is secured. In principle, however, it is also possible pursuant to the present invention that the component that is secured to the frame represents the frame component itself, for example the rest frame.

The guide pocket can be formed by folding a sheet-like cutout section. This cutout section can, for example, have a recess that extends from the top to the bottom and that serves to free or recess a portion of the adapter. With a mounting from below the recess can thus be formed in the upper region of the cutout section. The cutout section is folded such that its two halves rest against or coincide with one another, and the two front ends can subsequently be fixedly stitched or sewn to the covering. The front end advantageously has a greater vertical extension than does the rear end.

Such an embodiment of the guide pocket as a cutout section of suitable, adequately tear-resistant sheet-like material is thus also very economical. Subsequently, it is merely necessary to fold the cutout section and to sew it to the inner side of the covering in the region of the opening line.

Further specific features of the present invention will be described in detail subsequently.

DESCRIPTION OF SPECIFIC EMBODIMENTS

Figure 2:
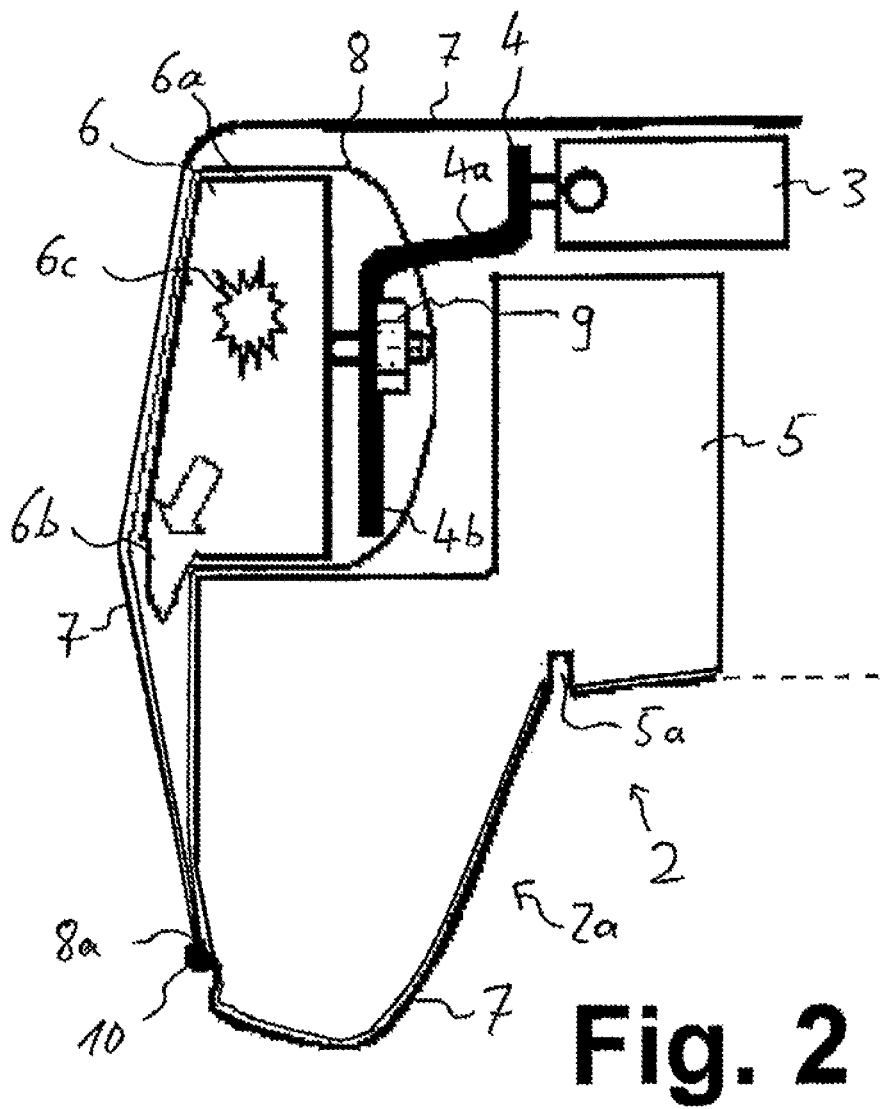
FIG. 2 is a cross-sectional view taken along the line A-A in FIG. 1 through the side wraparound of the backrest in the region of the airbag module with the airbag triggered or ignited.

Referring now to the drawings in detail, shown in FIG. 1 is a backrest 2 of a vehicle seat 1; the left side wraparound 2a of the backrest 2 is shown in detail in the cross-sectional view of FIG. 2.

As shown in FIG. 2, a mounting adapter 4 is secured, for example bolted or screwed, to a rest frame (rest structural component) 3 of the backrest 2 in such a way that the mounting adapter 4 projects laterally and forwardly from the rest frame 3. The rest frame is furthermore provided with a cushion body 5, which is mounted or placed in front of the rest frame 3; the cushion body 5 can, for example, be made of foam. The mounting adapter 4 extends from the rest frame 3 into a recessed area of the cushion body 5, and has a smaller or narrower transition portion 4a as well as a wider receiving portion 4b to which an airbag module 6 is fixedly secured, for example by being bolted or screwed thereto.

In a known manner, the airbag module 6 includes a sturdy housing 6a, an airbag 6b that can be unfolded and deployed, and as merely indicated in FIG. 2, a charge 6c for the inflation of the airbag 6b. In this connection, FIG. 2 shows the point in time of the ignition, during which the airbag housing 6a, at the right front, opens at an opening or target site of breaking or rupture, and in conformity therewith the airbag 6b unfolds toward the front.

A covering 7 covers the front side of the backrest 2, and for example the side surfaces, possibly also in an upper region of the backside, whereby furthermore a cover, for example in the form of a sheet or a cover plate, can be provided on the back side, which cover can serve to separate off the luggage space and/or to form a functional surface during the shifting or folding of the vehicle seat 1. The cushion body 5 is provided, for example, with a trimming groove 5a into which the covering 7 can be inserted.

Figure 4:
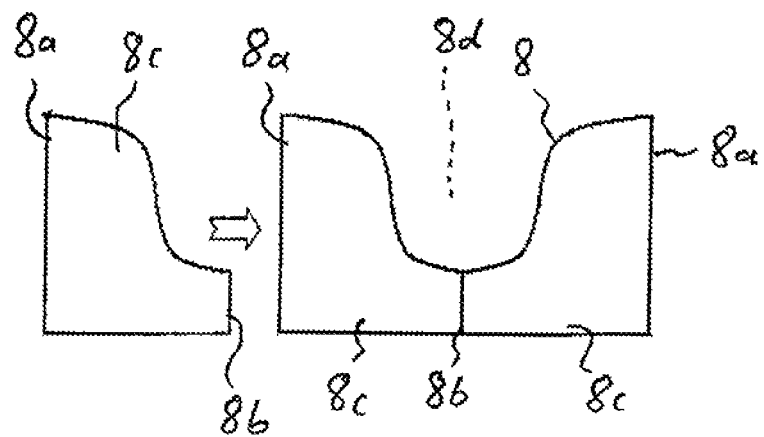
FIG. 4: shows the guide pocket in the folded together state at the left, and in the opened state at the right.

The right side of FIG. 4 shows a guide pocket 8 in its unfolded state, i.e. as a cut-out section, and the left side of FIG. 4 shows the guide pocket 8 in its folded state, in which its front ends 8a are placed together. In this connection, the front ends 8a have a greater vertical extension than does the rear end 8b that is formed by the fold line.

Figure 3:
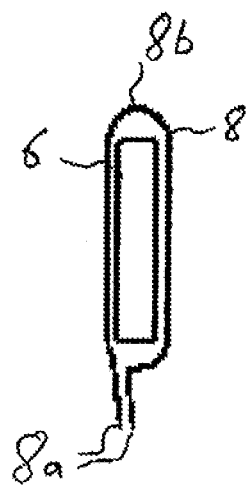
FIG. 3: shows the side airbag accommodated in the guide pocket.

Thus, in the cut-out section or guide pocket 8, a recess 8d is formed that here extends from above. The closed guide pocket 8 shown in FIG. 3, with the airbag module 6 accommodated therein, is open toward the top and the bottom.

The covering 7, for example in the region of the side wraparound 2a, is provided with an opening or breaking line 10, which in particular can be a tear seam, at which two halves of the covering are sewn together; furthermore, the opening line can also be formed by a perforation of the covering 7. The opening line 10 extends in the vertical direction along the covering 7. The front ends 8a of the guide pocket 8 are secured to the covering 7 in the opening line 10 or adjacent to the opening line 10. The front ends 8a can, for example, be sewn to ends of the covering in a common tear seam; alternatively, they can also be embodied as a combined opening line 10 by means of a double seam together with a tear seam. As the airbag 6b unfolds, the two halves 8c of the guide pocket 8 are pulled apart, so that also the front ends 8a are pulled apart, as a result of which the opening line 10 tears open and releases the airbag 6b, which unfolds toward the front.

Pursuant to the present invention, the guide pocket 8, which is sewn or stitched to the covering 7, is placed or mounted into the fixed arrangement comprised of the mounting adapter 4 and the airbag module 6. Pursuant to the embodiment shown in particular in FIG. 5, the guide pocket 8 can be mounted from below; with an appropriately different shape of the mounting adapter 4, this mounting process can also be effected, for example, from above. The guide pocket 8 is thus appropriately dimensioned so that such a mounting process is possible, and the guide pocket 8 thus frees or provides access to the area for the mounting adapter 4. During a mounting process from below, the rear ends 8b of the guide pocket 8 are thus formed in a lower region, and the upper region is recessed, as can be seen in particular at the left side of FIG. 5. The guide pocket 8 can thus be mounted from below into the arrangement shown in the middle of FIG. 5 in order to thus wrap around or embrace the air module 6 and a portion of the mounting adapter 4. As a consequence of this wrapping around or positive extending around, on the one hand a fixation of the sewn-on covering together with the cushion body 5 is achieved, and furthermore the orientation of the unfolding airbag 6b relative to the opening line 10 is ensured.

Figure 5:
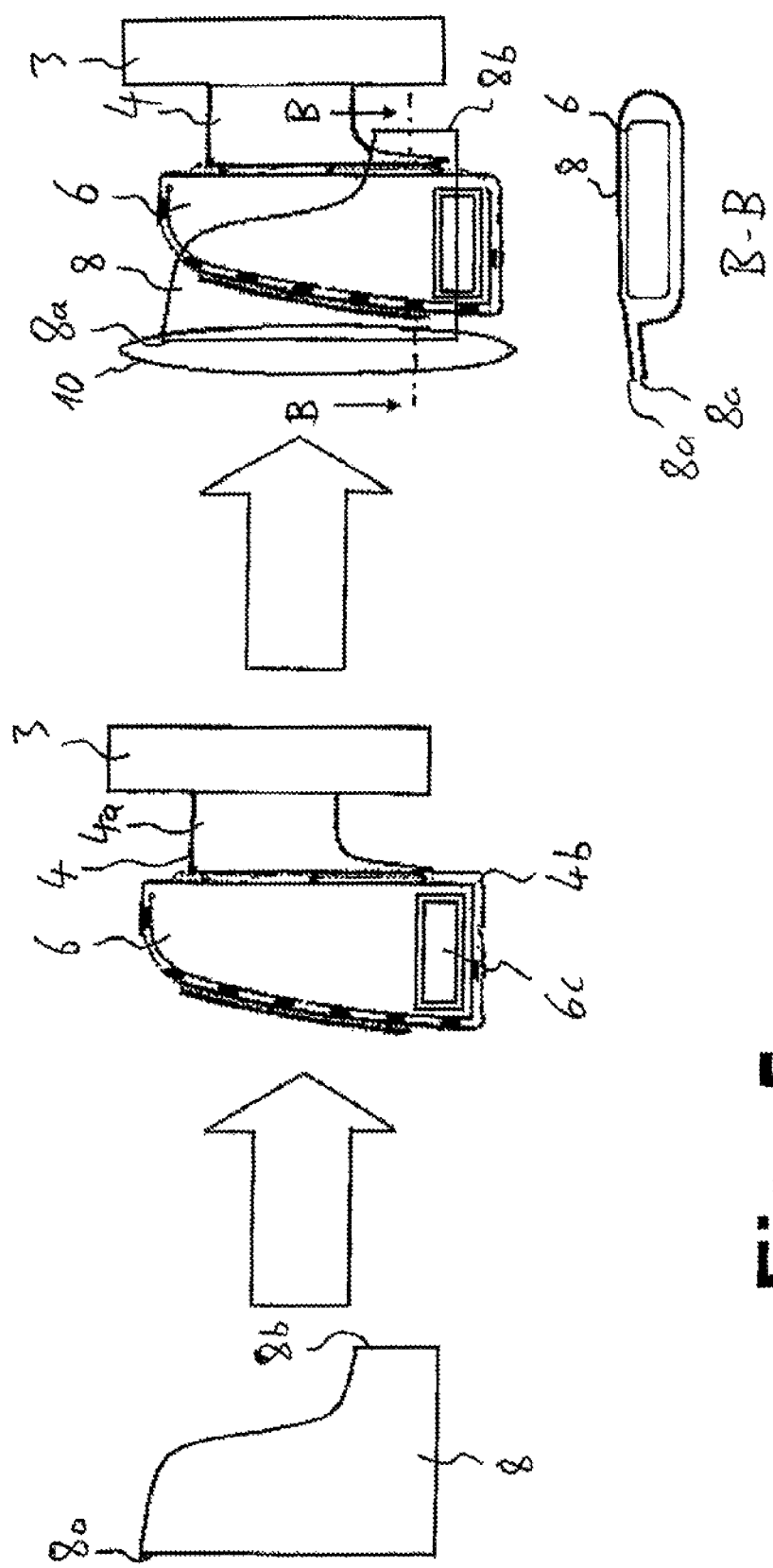
FIG. 5: shows the assembly steps for the installation of the airbag module.

The inventive mounting process is advantageously such that the airbag module 6 is fixedly secured to the mounting adapter 4, for example as shown by means of a screw/nut arrangement 9, whereby for example two screws or two bolts are already fixedly mounted on the housing 6a of the airbag module 6, are inserted through appropriate holes of the mounting adapter 4, and are fixedly secured to the mounting adapter 4 by means of nuts. In this way, a fixed or rigid unit is formed. Furthermore, the covering 7, with the guide pocket 8 secured thereto, is used as a unit, for example also together with the cushion body 5. For the assembly, the cushion body 5 is placed against the rest frame 3, i.e. is prefixed, and the guide pocket 8 is mounted from below into the fixed unit comprised of the mounting adapter 4 and the airbag module 6, as can be seen in FIG. 5. The covering 7 is subsequently pulled over the rest frame 3 and the cushion body 5.

The specification incorporates by reference the disclosure of German priority document 10 2010 021 297.10 filed May 22, 2010.

The present invention is, of course, in no way restricted to the specific disclosure of the specification and drawings, but also encompasses any modifications within the scope of the appended claims.

What we claim is:

1. An airbag arrangement in a vehicle seat, comprising:
   an airbag module (6) composed of an airbag housing (6a), an airbag (6b), and a charge (6c) for an unfolding of the airbag (6b); and
   a guide means (8) attached to a covering (7) of the vehicle seat (1) in the region of an opening line (10) of said covering (7), wherein said guide means (8) serves for a guidance of said airbag (6b), as it unfolds, to said opening line (10), further wherein said guide means (8) is a guide pocket that wraps around said airbag module (6) and a component (4) that is operatively secured to said vehicle seat (1), further wherein said guide pocket (8) has two front ends (8a) that are attached in the region of said opening line (10) of said covering (7), further wherein said airbag module (6) is secured to said component (4) that is secured to said vehicle seat (1), and wherein said guide pocket (8) is adapted to be placed from above or from below about said component (4) and said airbag module (6) and to extend about said airbag module (6) in a loop-shaped manner,
   wherein a rest frame (3) is operatively secured to said vehicle seat (1), and wherein said component (4) is a mounting adapter (4) that is secured to said rest frame (3), wherein said mounting adapter (4) extends forwardly from said frame component (3) into a free space adjacent to a cushion body (5) of said vehicle seat, further wherein said mounting adapter (4) is provided with a narrower transition portion (4a) as well as a wider receiving portion (4b) to which said airbag module (6) is mounted, and wherein said guide pocket (8) is looped at least about said receiving portion (4b) of said mounting adapter (4) together with the airbag module (6) secured thereto.

2. An airbag arrangement according to claim 1, wherein rear ends (8b) of said guide pocket (8) have a lesser vertical extension than do said front ends (8a) of said guide pocket (8).

3. An airbag arrangement according to claim 2, wherein said rear end (8b) is disposed below a portion of said component (4) that is secured to said vehicle seat (1) when said guide pocket (8) is mounted from below.

4. An airbag arrangement according to claim 2, wherein said guide pocket (8) has two essentially symmetrical halves (8c), and wherein said rear ends (8b) of said guide pocket (8) are in the form of fold lines of said two halves (8c) of said guide pocket (8).

5. An airbag arrangement according to claim 2, wherein said rear end (8b) is disposed above a portion of said component (4) that is secured to said car seat (1) when side guide pocket (8) is mounted from above.

6. An airbag arrangement according to claim 1, wherein said opening line (10) of said covering (7) is embodied as a tear seam (10), and wherein said front ends (8a) of said guide pocket (8) are stitched or sewn to said covering (7) in or adjacent to said tear seam (10).

7. An airbag arrangement according to claim 1, wherein said guide pocket (8) is formed by a folding of a sheet-like cutout section that is provided with a recess (8d) that extends from above or from below, and wherein said recess (8d) serves for a positioning of said guide pocket (8) in the region of said component (4) that is secured to said vehicle seat (1) for said securement of said airbag module (6) to said component (4).

8. A vehicle seat, comprising:
   a frame component (3);
   a cushion body (5);
   a covering (7) that extends about said frame component (3) and said cushion body (5); and
   an airbag arrangement according to claim 1, wherein said guide pocket (8) is mounted from above or from below about said component (4), which is secured to said frame component (3), and about said airbag module (6), which is received by said component (4) that is secured to said frame component (3),
   wherein said component (4) that is secured to said frame component (3) is a mounting adapter (4) that extends forwardly from said frame component (3) into a free space adjacent to said cushion body (5), further wherein said mounting adapter (4) is provided with a narrower transition portion (4a) as well as a wider receiving portion (4b) to which said airbag module (6) is mounted, and wherein said guide pocket (8) is looped at least about said receiving portion (4b) of said mounting adapter (4) together with the airbag module (6) secured thereto.

9. A vehicle seat according to claim 8, wherein said frame component (3) is a rest frame.

10. A method of mounting an airbag arrangement on a vehicle seat, including the steps of:
   securing an airbag module (6) to a component (4) that is secured to a frame component (3) of said vehicle seat (1);

providing a cushion body (5), a covering (7), and a loop-shaped guide pocket (8), wherein said guide pocket has two front ends (8a) that are attached in the region of an opening line (10) of said covering (7);

from below or from above, placing said guide pocket (8) about said component (4) that is secured to said frame component (3) and about said airbag module (6) such that said guide pocket (8) is wrapped about said airbag module (6) and said component (4) that is secured to said frame component (3); and completely covering said cushion body (5) and said frame component (3) of said vehicle seat (1) with said covering (7), wherein said component (4) that is secured to said frame component (3) is a mounting adapter (4) that extends forwardly from said frame component (3) into a free space adjacent to said cushion body (5), further wherein said mounting adapter (4) is provided with a narrower transition portion (4a) as well as a wider receiving portion (4b) to which said airbag module (6) is mounted, and wherein said guide pocket (8) is looped at least about said receiving portion (4b) of said mounting adapter (4) together with the airbag module (6) secured thereto.

\* \* \* \* \*